Jan. 26, 1937.  N. G. PETERSEN  2,068,699
ADJUSTABLE FOUR-WAY VIEW FRAMING DEVICE FOR VIEW FINDERS
Filed Dec. 7, 1935   2 Sheets-Sheet 1
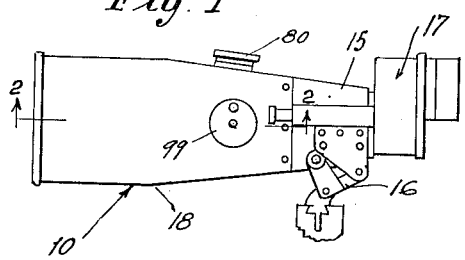
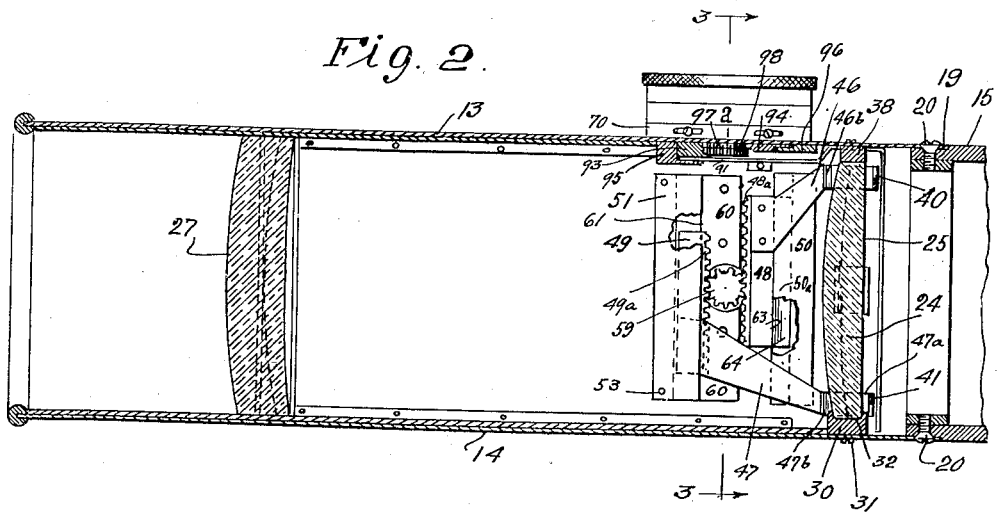
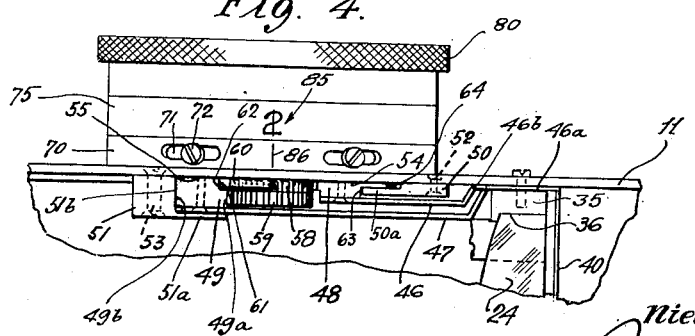
Inventor.
Niels G. Petersen.
Attorney Jan. 26, 1937.  N. G. PETERSEN  2,068,699
ADJUSTABLE FOUR-WAY VIEW FRAMING DEVICE FOR VIEW FINDERS
Filed Dec. 7, 1935  2 Sheets-Sheet 2

Inventor.
Niels G. Petersen.

Attorney

Patented Jan. 26, 1937

2,068,699

UNITED STATES PATENT OFFICE 2,068,699

ADJUSTABLE FOUR-WAY VIEW FRAMING DEVICE FOR VIEW FINDERS

Niels G. Petersen, Los Angeles, Calif., assignor to Mitchell Camera Corporation, West Hollywood, Calif., a corporation of Delaware Application December 7, 1935, Serial No. 53,357

11 Claims. (Cl. 88—1.5)

This invention relates generally to focusing or view finding instruments having adjustable matting or view-area framing devices as used in motion picture cameras. It may be mentioned that camera lenses of different focal lengths cause different extents of the field before the camera to occupy the image area on the film. It is desirable that the person looking within the view finder be able to ascertain just how much of the image visible on its ground glass will be photographed on the film in the camera, and it has therefore been the practice to provide the view finder with adjustable matting devices which may be adjusted to correspond with any camera lens then in use, so as to frame just that portion of the field visible on the view finder ground glass that will be photographed on the film. Thus, it becomes necessary to change the adjustment of this matting device each time a lens change is made in the camera.

View finders for motion picture cameras have been equipped in the past with four-way adjustable mats which, for instance, are slipped into position through slots in the side walls of the view finder casing, or else are formed of flexible material and are flexed and turned at right angles and guided along the inner surfaces of the side walls of the instrument casing instead of projecting out through the casing walls. The matting device last described is an improvement over the arrangement first mentioned, in that projection of the mats outside the view finder casing is avoided, but is somewhat undesirable in that it leads to complications and expense in the provision of suitable operating and adjusting means.

It is an object of the present invention to provide an adjustable four-way mat device for instruments such as view finders, wherein the mat or view area defining members are contained entirely within the instrument casing, and which is extremely simple and inexpensive in construction, as well as easy to operate.

It is a further object of the invention to provide improved and simplified means for operating the mat or view area defining elements.

The device of the present invention departs from the practice of providing metal slides which move inwardly through the casing wall of the instrument, and substitutes a set of four relatively narrow adjustable frame members, which are adjustably movable across the light conduit so as to frame view areas of various dimensions. Two of the frame members extend in horizontal directions and are vertically movable, being mounted at their ends on vertically moving racks which slide in vertical guideways on the inner surface on one side wall of the instrument, and are moved in opposite directions by means of a pinion means and single manual knob. The other two frame and single manual knob. The other two frame members extend in vertical directions and are horizontally movable, being mounted on a pair of racks movable in a horizontal direction in guideways on one horizontal wall of the casing and operated by a pinion means and single manual knob. The arrangement is such that the frame members of either pair may be moved toward and from one another by operation of the corresponding knob, so that adjustment of the view area defined by the members is most easily accomplished.

The invention will be better understood from the following detailed description of a present preferred embodiment thereof, reference for this purpose being had to the accompanying drawings, in which:

Fig. 1 is a plan view of a view finder incorporating the improvements of the present invention;

Fig. 2 is a vertical section taken as indicated by line 2—2 of Fig. 1;

Fig. 4 is a fragmentary view looking downwardly on a portion of the device shown in Fig. 2, the upper wall 13 of the finder casing being removed.

Figure 3:
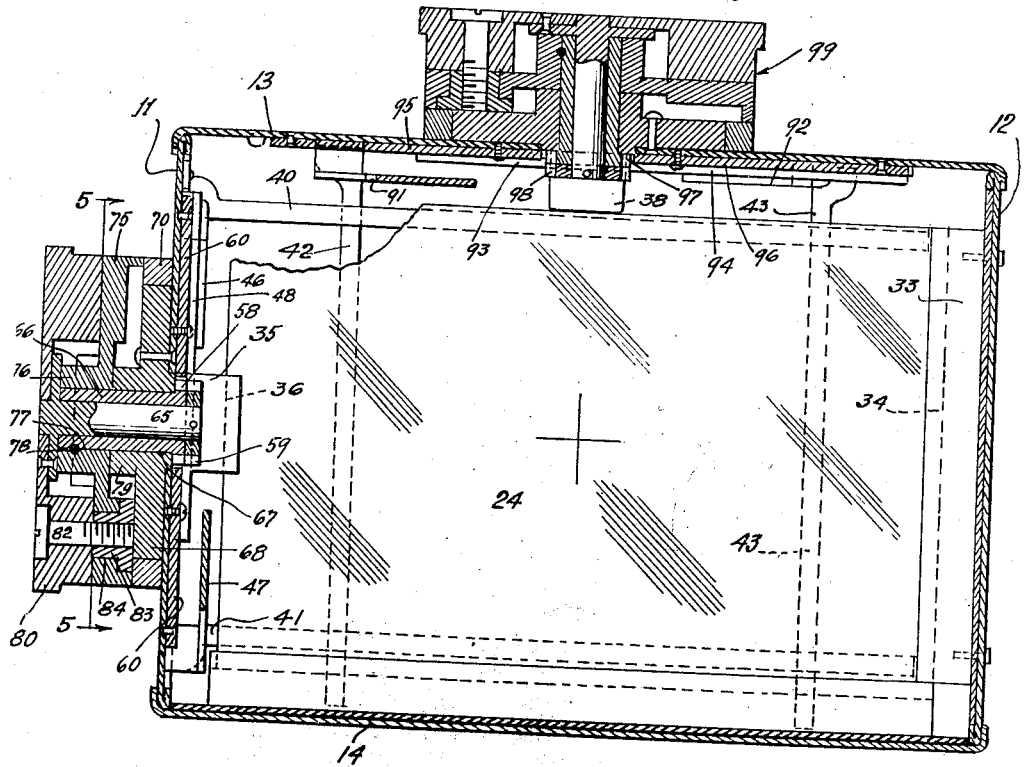
Fig. 3 is a vertical transverse section taken as indicated by line 3—3 of Fig. 2.

In the drawings the view finder is designated generally at 10, and is shown to comprise a casing forming a light conduit and made up of vertical side walls 11 and 12 and top and bottom walls 13 and 14, respectively, the casing being rectangular in cross section (see Fig. 3). The fortangular end of the finder body is comprised of a mounting casting 15, provided with an attachment device 16 through which the finder is mounted on the camera, said casting 15 carrying the finder objective combination 17. The upper and lower walls of casting 15 and the finder body are parallel, while the side walls diverge rearwardly to a point 18 from the objective combination somewhat to the rear of the center of the finder body, and then extend parallel to each other to the rear end of the finder (see Fig. 1). The walls 11, 12, 13 and 14 of the finder casing fit over a reduced extension 19 of mounting casting 15 so as to be flush with the outer surface thereof, and are fastened to said casting as by screws 20.

Mounted to the rear of the objective combination and in the divergent section of the casing, and located properly with respect to the focal plane of the objective combination, is a glass 24, having a suitable image receiving surface 25 on its forward face, surface 25 being at the focal plane of the objective. This image receiving surface 25 may, for instance, be a ground glass surface. The glass 24, which is rectangular in configuration, is preferably a plano-convex lens, its forward plane surface being ground as mentioned, and its rearward surface being slightly convex so that the lens acts as a light collector. To the rear of lens 24 may be another collecting lens 27, as shown in Fig. 2.

Lens 24 is mounted in a frame comprising a horizontal lower member 30, fastened to the casing as by screws 31, and having a groove 32 receiving the lower edge of the lens, a vertical side member 33 similarly fastened to vertical casing wall 12 and provided with a groove 34 receiving the corresponding vertical edge of the lens, and a support 35 mounted on opposite side wall 11 and provided with a groove 36 adapted to receive the other vertical edge of the lens, said support 35 being of relatively small dimension in vertical height and being mounted on casing wall 11 midway between its upper and lower edges, so as to engage lens 24 substantially opposite its optical center. The upper horizontal edge of lens 24 is engaged by a relatively short support 38 mounted on the inner surface of the removable upper wall 13 of the casing, and located midway between its side edges so as to engage lens 24 substantially opposite its optical center.

A pair of relatively narrow, parallel, horizontally extending frame or view area defining members 40 and 41 is provided, and immediately forwardly of said members is provided a pair of relatively narrow, parallel, vertically extending frame or view area defining members 42 and 43. These framing members 40, 41, 42 and 43 are located immediately forwardly of the ground glass surface 25 of lens 24, and form a frame for the image cast on surface 25. Members 40 and 41 are vertically movable toward and from one another, and members 42 and 43 are horizontally movable toward and from one another, for the purpose of adjusting the rectangular view area defined by said members.

The supporting and operating means for horizontally-extending framing members 40 and 41 will now be described. Members 40 and 41 extend horizontally and at right angles, as seen in plan, from arms 46 and 47, respectively, which extend from members 40 and 41 rearwardly within the casing along its side wall 11 and are mounted at their rearward ends on parallel, vertically movable racks 48 and 49, respectively. These arms 46 and 47 are formed opposite lens 24 with portions 46a and 47a, respectively, which are adapted to slide adjacent the inner surface of wall 11 above and below lens support 35, while to the rear of said portions 46a and 47a the arms are offset inwardly, as at 46b and 47b, and thence extend rearwardly to racks 48 and 49, on the outer surfaces of which they are tightly mounted, as mentioned above.

The rack teeth 48a and 49a of racks 48 and 49, respectively, face toward one another, but are offset horizontally, so as to mesh with concentric adjacent pinions 58 and 59. It may here be mentioned that these pinions are relatively rotatable for adjustment purposes, but in service are fastened rigidly together, as later to be explained. The two pinions when clamped rigidly together therefore constitute simply a single pinion member located between and meshing with the two racks, and adapted for moving the racks in opposite directions.

Racks 48 and 49 are vertically guided by guide strips 50 and 51, respectively, fastened to casing wall as by rivets 52 and 53. The respective inner surfaces 54 and 55 of racks 48 and 49 slide against the inner surface of wall 11, as shown in Fig. 4. Rack 49 is confined by a projection 51a of guide strip 51, and its surface 49b slides against guide strip surface 51b. Plates 60 mounted on wall 11 above and below the pinions are slidably engaged along vertical edge 61 by rack shoulder 62, located between inner rack surface 55 and rack teeth 49a. The opposite vertical edges of these plates 60 are slidably engaged by the ends of rack teeth 48a of rack 48 (Fig. 2). Rack 48 is cut with a shoulder at 63, which slides against the vertical edge of guide strip projection 50a, said projection overlying and confining the rearward reduced portion 64 of the rack.

The thickness of rack 49 is such that the arm 47 which is mounted on its outer surface clears the outer surface of pinion 59 (Fig. 4). Guide strip projection 51a overlies arm 47 as well as the rack, the rearward portion of said arm sliding against the inner surface of said projection as the rack is moved. The rearward portion of arm 46, on the other hand, lies outside guide member 50. Rack 48 and guide strip 50 are of less thickness than rack 49 and guide strip 51, so as to avoid interference between arm 47 and rack 48 and its arm 46, all as illustrated in Fig. 4.

The operating knob for pinions 58 and 59 will now be described. Pinion 59 is pinned on the inner end of a knob center shaft 65 that extends outwardly through an opening in casing side wall 11. Surrounding shaft 65 is a gear sleeve 66 that has on its inner end the pinion 58 that meshes with rack 48. Gear 59 on knob center shaft 65 is capable of being rotatably adjusted with reference to gear 58 on gear sleeve 66, but during operation said gears are locked securely together, as later to be described.

Gear sleeve 66 is mounted to rotate in the axial bore 67 of a mounting disk 68 tightly mounted on the outer surface of casing wall 11. A ring 70 of the thickness of disk 68 is relatively rotatable on the periphery of said disk, and means are provided for fastening ring 70 to the disk after proper rotatable adjustment thereon. For instance, ring 70 may be provided with circumferential slots 71 through which pass clamping screws 72 which screwthread into the periphery of disk 68, their heads engaging ring 70. The purpose of this adjustment will appear later.

Circular plate 75 of the diameter of ring 70 is mounted for rotation on the outer side of said ring. This plate 75 has a central outwardly extending boss 76 and an axial bore 77 through which extends the outer end of gear sleeve 67, said plate and gear sleeve being fastened rigidly together as by means of pin 78. Plate 75 has bearing against the outer end of a boss 79 on mounting plate 68. Gear sleeve 67 and plate 75 are thus rigid with one another and are supported on disk 68 and ring 70.

Figure 5:
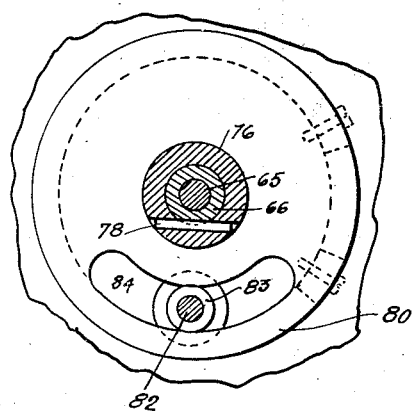
Fig. 5 is a detail section taken as indicated by line 5—5 of Fig. 3.

Knob center shaft 65 has rigidly mounted on its outer end an operating knob 80, the inner surface of which comes against the outer surface of plate 75. An adjustment screw 82 mounted on knob 80 extends inwardly and screwthreads into a bushing 83 mounted in an arcuate slot 84 in circular plate 75 (see Fig. 5). It will be evident that when screw 82 has been loosened knob 80 may be rotated relatively to plate 75, within the limits set by the length of slot 84, and by tightening screw 82 knob 80 is securely locked to plate 75. It is this adjustment that enables proper setting of the angular relation between pinion gear 59 which is rigid with the knob and the pinion gear 58 on gear sleeve 67. With adjustments all properly made, and with screw 82 tightened, rotation of knob 80 rotates pinion gears 58 and 59 as one, and so operates the two racks 48 and 49 to move inwardly or outwardly in unison. The knob construction and described adjustment operation enables relative adjustment of the upper and lower frame members 40 and 41 controlled by pinions 59 and 58, respectively, for the purpose of centralizing the opening therebetween. This knob construction per se is the claimed subject matter of an earlier application of George A. Mitchell, entitled Operating means for four-way view finder mats, filed October 16, 1933, Ser. No. 693,739, which application has matured into Patent No. 2,058,813, October 27, 1936.

A calibrated scale 85 for the frame members operated by knob 80 is inscribed on the outer periphery of circular plate 75, and an indicating mark 86 is inscribed on the adjustable ring 70, as clearly shown in Fig. 4.

Exactly similar operating means is provided for the vertically disposed frame members 42 and 43. Thus, frame members 42 and 43 are mounted on arms 91 and 92, respectively, which extend over the upper edge of lens 24 between lens support 38 and the side walls of the casing, and are mounted at their inner ends on horizontally movable racks 93 and 94, respectively, said racks being guided by respective guides 95 and 96, and being operated by pinions 97 and 98 rotated in unison by an adjustable knob device 99 mounted on upper casing wall 13, all of which may be exactly similar to the previously described operating means for horizontally extending frame members 40 and 41.

Thus manual rotation of knob 80 causes equal opposed movements of the vertically movable frame members 40 and 41 which define the horizontal margins of the view area within the finder, while manual rotation of knob 99 caused equal opposed movements of the horizontally movable frame members 42 and 43 that define the vertical margins of the view area. The openings between the two pairs of frame members may be centralized with reference to the optical axis of the instrument by simple adjustment of the two knobs, and with this adjustment once made, a view area of any dimensions may be quickly framed by a simple setting of the two knobs 80 and 99. The entire arrangement is such that the view finder need be but slightly larger than the largest casing need be but slightly larger than the largest view area to be framed within the instrument, and the device is characterized by compactness, simplicity of construction, and extreme facility and speed of operation and adjustment.

While I have shown and described certain specific means embodying my invention, it is to be understood that various changes and modifications may be made without departing from the spirit and scope of the invention as expressed in the appended claims.

I claim:

1. In an optical device having a casing defining a light conduit, a pair of relatively narrow view area framing members extending in parallel relation across the light conduit, arms on said framing members extending substantially at right angles to the framing members along the inner surface of one of the casing walls, a pair of parallel racks supporting said arms, said racks having oppositely facing rack teeth on their proximate edges, and said racks being movable along said casing wall in directions at right angles to the direction of extension of the framing members, pinion gear means between and meshing with said racks to move them in unison in contrary directions, and means for operation of said pinion gear means.

2. In an optical device having a casing defining a light conduit, a pair of relatively narrow view area framing members extending in parallel relation across the light conduit, arms on said framing members extending substantially at right angles to the framing members along the inner surface of one of the casing walls, a pair of parallel racks supporting said arms, said racks having oppositely facing rack teeth on their proximate edges, and said racks being movable along said casing wall in directions at right angles to the direction of extension of the framing members, pinion gear means between and meshing with said racks to move them in unison in contrary directions, and a single knob for operation of said pinion gear means.

3. In an optical device having a casing defining a light conduit, a pair of relatively narrow view area framing members extending in parallel relation across the light conduit, a pair of parallel racks, each supporting one of said framing members, said racks having oppositely facing rack teeth on their proximate edges, and said racks being movable inside said casing wall in directions at right angles to the direction of extension of the framing members, pinion gear means meshing with said racks to move them in unison in contrary directions, and means for operation of said pinion gear means.

4. In an optical device having a casing defining a light conduit, a pair of relatively narrow view area framing members extending in parallel relation across the light conduit, a pair of parallel racks, each supporting one of said framing members, said racks having oppositely facing rack teeth on their proximate edges, and said racks being movable inside said casing wall in directions at right angles to the direction of extension of the framing members, pinion gear means between and meshing with said racks to move them in unison in contrary directions, and a single knob for operation of said pinion gear means.

5. In an optical device having a casing of rectangular cross section defining a light conduit in which an image is formed in a focal plane transverse of the casing, a lens in the casing having an image receiving surface in said focal plane, means supporting said lens in the casing including a support on one casing side wall engaging the lens only at a point midway of the length of the lens edge facing that side wall, a pair of relatively narrow view area defining framing members extending in parallel relation in front of and across the lens in directions at right angles to said one casing side wall, supporting arms on the ends of said framing members adjacent said casing side wall extending rearwardly within the casing, one above and one below the lens support on said one casing wall, a pair of parallel racks supporting the rear ends of said arms, said racks movable inside said one casing wall in directions at right angles to the direction of extension of the framing members, a pinion gear means between and meshing with said racks to move them in unison in contrary directions, and a rotatable knob on said casing wall for rotation of said pinion gear means.

6. In an optical device having a casing of rectangular cross section defining a light conduit in which an image is formed in a focal plane transverse of the casing, a lens in the casing having an image receiving surface in said focal plane, means supporting said lens in the casing including a support on one casing side wall engaging the lens only at a point midway of the length of the lens edge facing that side wall, a pair of relatively narrow view area defining framing members extending in parallel relation in front of and across the lens in directions at right angles to said one casing side wall, supporting arms on the ends of said framing members adjacent said casing side wall extending rearwardly within the casing, one above and one below the lens support on said one casing wall, a pair of parallel racks supporting the rear ends of said arms, said racks movable inside said one casing wall in directions at right angles to the direction of extension of the framing members, a pinion gear means meshing with said racks to move them in unison in contrary directions, and means for operation of said pinion gear means.

7. In an optical device having a casing of rectangular cross section defining a light conduit in which an image is formed in a focal plane transverse of the casing, a lens in the casing having an image receiving surface in said focal plane, a pair of relatively narrow view area defining framing members extending in parallel relation in front of and across the lens in directions at right angles to said one casing side wall, supporting arms on the ends of said framing members adjacent said casing side wall extending rearwardly within the casing past the edge of said lens, a pair of parallel racks having rack teeth facing in opposite directions on their proximate edges, said racks supporting the rear ends of said arms, and said racks being movable inside said one casing wall in directions at right angles to the direction of extension of the framing members, a pinion gear means between and meshing with said racks to move them in unison in contrary directions, and a rotatable knob on said casing wall for rotation of said pinion gear means.

8. In an optical device having a casing defining a light conduit, a pair of relatively narrow view area framing members extending in parallel relation across the light conduit, a pair of parallel racks, each supporting one of said framing members, said racks having oppositely facing rack teeth on their proximate edges, and said racks being movable inside said casing wall in directions at right angles to the direction of extension of the framing members, a pair of relatively rotatable pinion gears between said racks, one meshing with one of the racks and one with the other, and means for rotating said pinion gears.

9. In an optical device having a casing defining a light conduit, a pair of relatively narrow view area framing members extending in parallel relation across the light conduit, a pair of parallel racks, each supporting one of said framing members, said racks having oppositely facing rack teeth on their proximate edges, and said racks being movable inside said casing wall in directions at right angles to the direction of extension of the framing members, a pair of relatively rotatable pinion gears between said racks, one meshing with one of the racks and one with the other, and a unitary knob member for rotating said pinion gears in unison.

10. In an optical device having a casing defining a light conduit, a pair of relatively narrow view area framing members extending in parallel relation across the light conduit, a pair of parallel racks, each supporting one of the framing members, said racks having their proximate rack-toothed edges facing in opposite directions and disposed in planes offset from one another, and said racks being movable inside the casing wall in directions at right angles to the direction of extension of the framing members, a pair of adjacent concentric and relatively rotatable pinion gears between said racks, one meshing with one of the racks and one with the other, and means for rotating said pinion gears.

11. In an optical device having a casing defining a light conduit, a pair of relatively narrow view area framing members extending in parallel relation across the light conduit, a pair of parallel racks, each supporting one of the framing members, said racks having their proximate rack-toothed edges facing in opposite directions and disposed in planes offset from one another, and said racks being movable inside the casing wall in directions at right angles to the direction of extension of the framing members, a pair of adjacent concentric and relatively rotatable pinion gears between said racks, one meshing with one of the racks and one with the other, and means for rotating said pinion gears in unison.

NIELS G. PETERSEN.